United States Patent [19]
Yasuda

[11] Patent Number: 5,150,399
[45] Date of Patent: Sep. 22, 1992

[54] PUBLIC TELEPHONE INTERFACE AND METHOD OF OPERATING THE SAME

[75] Inventor: Jerry Yasuda, Villa Park, Calif.

[73] Assignee: Telephonic Equipment Corporation, Irvine, Calif.

[21] Appl. No.: 572,764

[22] Filed: Aug. 27, 1990

[51] Int. Cl.⁵ .................. H04M 3/50; H04M 1/64
[52] U.S. Cl. ................................ 379/67; 379/88; 379/201; 379/155; 379/143
[58] Field of Search ............... 379/84, 67, 88, 201, 379/154, 155, 143

[56] References Cited

U.S. PATENT DOCUMENTS

| | | | |
|---|---|---|---|
| 4,811,382 | 3/1989 | Sleevi | 379/67 |
| 4,825,460 | 4/1989 | Carter et al. | 379/67 |
| 4,853,952 | 8/1989 | Jachmann et al. | 379/89 |
| 4,998,272 | 5/1991 | Hawkins, Jr. et al. | 379/88 |

Primary Examiner—James L. Dwyer
Assistant Examiner—Fan Tsang
Attorney, Agent, or Firm—George F. Bethel; Patience K. Bethel

[57] ABSTRACT

Voice message storage from a first plurality of telephones, such as a plurality of coin operated pay phones, is provided by a multiprocessor system including a CPU, a software driven line card connected to each coin operated telephone line, and a single voice message computer. The voice message computer and the line cards are coupled together through a private internal data bus which is independent of the telephone lines and the central office switch systems. The voice message computer provides spot advertising of selected messages during dead times in the telephone connection, provides abbreviated, coin-free, speed dialing, coin box accounting, and remote automated coin box diagnostic monitoring. Voice messages are stored in the voice message computer, which originate both at a pay phone for later delivery to a phone through the central office switching system, or which originate with a telephone directly connected to the central office switching system.

11 Claims, 5 Drawing Sheets

PUBLIC TELEPHONE INTERFACE AND METHOD OF OPERATING THE SAME

BACKGROUND OF THE INVENTION

1. Field of the Invention

The invention relates to the field of computer controlled telephone equipment and in particular for equipment for communicating voice messages between coin operated telephones and telephone stations coupled through a central office switch.

2. Description of the Prior Art

Voice messaging with coin operated telephones through a central office is well known and a prior art example is shown by Axberg, "Method for Receiving and Delivering Voice Messages" U.S. Pat. No. 4,766,604 (1988). The system described in Axberg utilizes a plurality of smart pay phones connected to a privately owned central office. That is to say, pay phones must be modified to include a central processor or other logic circuitry and memory.

In Axberg a caller picks up the phone and is prompted to insert coins. After the coins are delivered, the caller's number is entered through a keypad and is stored within the smart pay phone. The number is transmitted to the central office and the smart pay phone waits for an answer detection. If the call cannot be completed, the smart pay phone issues an audio prompt and the handset is disconnected from the smart pay phone. The original call is disconnected from the trunk and the voice message center is then speed dialed through the central office by the smart pay phone. When the voice message center answers, the handset is reactivated and another prompt is produced. The caller is given the option to request the voice message center to deliver a 20 second audio message to the called station and to attempt to complete the call every 15 minutes for the next two hours. If the caller does not wish to utilize this service, he hangs up and his coins are returned from escrow. If he does wish to utilize this service, activation of the pound key releases the coin into the coin vault. The smart pay phone then transmits the called number to the voice message center through the central switching office.

The smart pay phone transmits a four digit security code to ensure that the smart pay phone is entitled to transmit voice messages to the voice message center. The security code is evaluated and if permitted, the voice message center issues a prompt to the smart pay phone asking the user to state his name and record his message. After about five seconds, a determination is made whether an audio signal is being transmitted to the voice message center.

If there is no such signal, an audio prompt is issued and the smart pay phone is disconnected. If an audio signal is being sent to the message center, the message is stored in a queue together with the transmitted called number. Thereafter, processing of the stored message and called number is completed at the voice message facility. Axberg requires substantial modification of the pay phones in order to operate within the described system.

Carter et al, "Line Interface Unit for Caller Controlled Receipt and Delivery of Voice Messages," U.S. Pat. No. 4,825,460 (1989) describes a line interface unit for controlling the receipt and delivery of voice messages over a telephone system having a voice message facility connectable to at least one calling station and a called station via a central office. The interface unit includes circuit modules, which allow it to communicate with the central office on the tip and ring lines, to translate DTMF tones from the coin phone into communication commands which stores a voice message in a voice message facility connected to the central office.

In both Axberg and Carter the coin operated telephone must be modified or provided with an interface unit which allows the telephone to communicate to the voice message facility through the central office. The need to comply with the communication protocol of the central office restricts the flexibility and communication rates which are achievable with the voice message facility.

Communication between the pay phone and the voice message facility, whether implemented by circuitry within the pay phone or in an interface line unit, must be compatible with the central office. The operation of the system as a whole is thus directly affected by any communication loads or difficulties in the central office. Thus, the signal to noise ratio realized in the system can never be better than that provided by the central office.

Software driven program execution by the voice message facility and by the pay phone must accordingly be compatible with and subject to the methodology of operation implemented within the central office. In many cases in the prior art outbound calls from the voice message facility cannot be monitored by any of the circuitry in the pay phone or line interface unit, since once the message is delivered, the voice message facility operates autonomously from the other elements within the system.

If the central switching office is overloaded, a busy or no answer condition will be returned to the pay station notwithstanding the fact that the voice message facility may otherwise have capability of handling the call.

Therefore, what is needed is a telephone communication system useable with coin operated phones which are not subject to the limitations of the prior art as discussed above and which has an architecture making it capable of performing additional communication functions not previously provided by voice message systems operating with coin operated telephones.

BRIEF SUMMARY OF THE INVENTION

The invention is an apparatus for use in combination with a plurality of coin operated pay phones, a telephone central office switch system and with a plurality of destination telephones coupled to the central office switch system. The pay phones, destination telephones and central office switch system are coupled together through telephone lines. The apparatus comprises a plurality of call intercept circuits. Each one of the plurality of call intercept circuits handles communication or corresponding ones of the telephone lines coupled to one of the plurality of coin operated pay phones and to the central office switch system. A computer circuit stores and processes digital information. A digital bus couples the computer circuit with each of the plurality of call intercept circuits. The computer circuit is coupled to the central office switch system. The computer circuit is operative to voice interactively communicate through the call intercept circuits with each one of the plurality of coin operated pay phones. The computer circuit selectively stores a voice message originating with at least one of the coin operated pay phones through a corresponding one of the plurality of call intercept circuits. The voice message is later selectively transmitted by the computer circuit through the central office switch system to a user-selected one of the plurality of destination telephones.

As a result, voice messages are received from a plurality of coin operated pay phones without dependence upon communication through the central office switch system and the voice message facility.

The computer circuit comprises a central processing circuit coupled to the digital bus and a memory circuit for storing digital information. The memory circuit is coupled to the digital bus. An output channel is coupled to the digital bus for communicating digital information from the computer circuit to the central office switch system.

The apparatus is used in combination with an automatic message accounting teleprocessing system and further comprises an input-output circuit for communicating information from the computer circuit in a format acceptable to the automatic message accounting teleprocessing system.

The computer circuit transmits a selected one of a plurality of advertising messages through selected ones of the call intercept circuits to corresponding selected one of the plurality of coin operated pay phones.

Each of the plurality of call intercept circuits comprises a circuit for performing abbreviated dialing with an abbreviated number from the corresponding one of the coin operated pay phones. A complete telephone number corresponding to the abbreviated number is sent from the corresponding coin operated pay phone. The complete number is transmitted to the central office switch system by the apparatus.

The complete telephone number transmitted to the central office switch system is provided to the selected one of the call intercept circuit from the computer circuit.

Each of the plurality of call intercept circuits detects the status of coin transactions in each of the corresponding ones of the plurality of coin operated pay phones. The computer circuit stores, processes and selectively reports the transaction.

The call intercept circuit comprises a microprocessor, a plurality of relays selectively driven by the microprocessor, and a bidirectional voice encoder/decoder for analog-to-digital and digital-to-analog conversion. The plurality of relays is selectively coupled to the plurality of coin operated pay phones and central office switch system on one hand and to the voice encoder/decoder on the other. An input/output interface circuit addressably receives and transmits digital information. The input/output interface circuit is coupled to the voice encoder/decoder and to the microprocessor. A bus interface circuit is coupled to the input/output interface circuit. The bus interface circuit is coupled to the digital bus. The microprocessor handles bidirectional voice communication between the plurality of coin operated pay phones and the computer circuit.

The call intercept circuit further comprises a coin tone detector circuit coupled to the plurality of relays for detecting and communicating coin drops within the plurality of coin operated pay phones to the microprocessor. The coin tone detector circuit has its output coupled to the microprocessor.

The call intercept circuit further comprises a DTMF transceiver. The DTMF transceiver is coupled to the plurality of relays and to the microprocessor for bidirectionally communicating DTMF encoded communication between the plurality of coin operated pay phones and the apparatus.

Each call intercept circuit further comprises a call progress detector circuit. The call progress detector circuit has its input coupled to the plurality of relays and its output coupled to the microprocessor for communicating status of corresponding ones of the telephone lines coupled to the central office switch system and coin operated pay phone to the apparatus.

The channel output circuit comprises a buffered relay circuit coupled to the central office switch system, and a voice encoder/decoder coupled to the buffered relay circuit. The voice encoder/decoder bidirectionally converts analog-to-digital and digital-to-analog voice signals. An input/output interface circuit receives and transmits addressable digital information. The input/output interface circuit is coupled to the voice encoder/decoder. A bus interface circuit is coupled to the input/output interface circuit. The bus interface circuit is coupled to the digital bus so that voice messages stored within the computer circuit are selectively and controllably communicated from the apparatus through the central office switch system to a user selected one of the plurality of the destination telephones.

The call intercept circuit further comprises a current monitoring circuit for monitoring signal conditions on the telephone lines coupling the plurality of coin operated telephones to the call intercept circuit and the telephone lines coupling the central office switching system. The computer circuit is the sole situs of storage of the voice messages selectively received from the plurality of coin operated telephones. The apparatus is adaptable to being coupled to telephone lines of different signal format without alteration of the storing of voice messages within the computer circuit.

The computer circuit also comprises a circuit for monitoring inbound calls from one of the plurality of destination or conventional station telephones through the central office switch system to a selected one of the plurality of pay phones. The inbound monitoring circuit provides message storage of the inbound call and delayed delivery of the stored message to the selected one of the plurality of coin operated pay phones.

The invention is also a method of providing bidirectional voice messaging from a first plurality of telephones through a central office switch system to a second plurality of telephones without accessing the central office switch system to leave a voice message. The method comprises the steps of originating a call in one of the first plurality of telephones. A busy/no answer response from a called one of the second plurality of telephones is detected through the central office switch system. The step of detecting is performed in a call intercept circuit coupled between the first plurality of telephones and the central office switch system. The second plurality of telephones is coupled to the central office switch system. A prestored voice prompt, stored in a voice message circuit coupled to the call intercept circuit, is provided to offer voice message storage within the voice message circuit. If acceptance of a message intercept is detected, a message from a caller at one of the first plurality of telephones is stored within the voice message circuit. The stored message from the voice message circuit is selectively later accessed by a selected one of the second plurality of telephones by communication through the central office switch system.

As a result, voice message handling is performed independently of the central office switch system.

The method further comprises the step of accumulating a record of calls originated from the first plurality of telephones for selective reporting of a accumulated call record.

The method further comprises the steps of originating a call from the second plurality of telephones to one of the first plurality of telephones through the central office switch system. A voice prompts is then provided to the calling telephone of the second plurality of telephones offering to store a voice message within the voice message circuit. Acceptance of the offer from the caller at one of the second plurality of telephones is detected. The voice message provided by the caller is stored in the voice message circuit. The stored voice message is selectively accessed later by the selected one of the first plurality of telephones.

As a result, both incoming and outgoing telephone calls are provided with voice message capability.

Finally the invention is also characterized as an apparatus for providing voice message storage between a first plurality telephones and a second plurality of telephones connected through a central office switch system. The invention comprises a plurality of first programmable circuits for selectively processing telephonic communication between the first and second plurality of telephones through the central office switch system. A digital bus is coupled to the plurality of first programmable circuits. A single second programmable circuit is coupled to the digital bus. The second programmable circuit provides stored voice prompts to the first and second plurality of telephones and provides selective storage of voice messages from any one of the first and second plurality of telephones to a selected other one of the first and second plurality telephones. The voice message from a caller, using one of the first plurality of telephones, is selectively stored within the second programmable circuit without communication through the central office switch system.

As a result, voice messaging with at least the first plurality of telephones is performed independently of the central office switch system.

The invention may better be visualized by now turning to the following drawings wherein like elements are referenced by like elements.

The invention and its various embodiments may be better understood by now turning to the following detailed description.

DETAILED DESCRIPTION OF THE PREFERRED EMBODIMENTS

Voice message storage from a first plurality of telephones, such as a plurality of coin operated pay phones, is provided by a multiprocessor system including a CPU, a software driven line card connected to each coin operated telephone line, and a single voice message computer. The voice message computer and the line cards are coupled together through a private internal data bus which is independent of the telephone lines and the central office switch systems. The voice message computer provides spot advertising of selected messages during dead times in the telephone connection, provides abbreviated, coin-free, speed dialing, coin box accounting, and remote automated coin box diagnostic monitoring. Voice messages are stored in the voice message computer, which originate both at a pay phone for later delivery to a phone through the central office switching system, or which originate with a telephone directly connected to the central office switching system.

Figure 1:
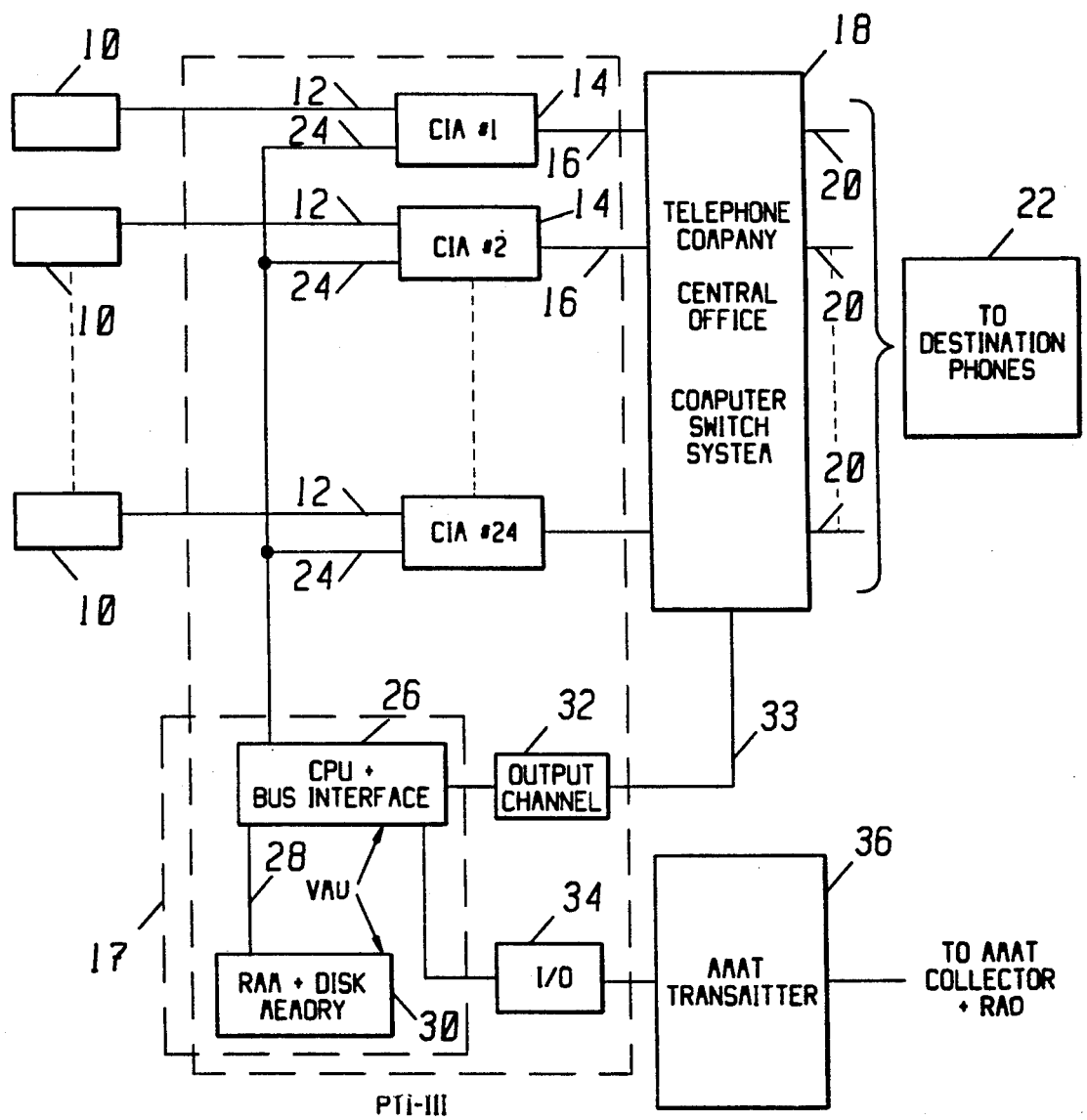
FIG. 1 is a diagrammatic block diagram of a coin operated telephone system wherein the invention is illustrated.

FIG. 1 shows a plurality of coin operated telephones, generally denoted by reference numeral 10, coupled through a corresponding plurality of conventional telephone lines 12 to a corresponding plurality of call intercept apparatus (CIA) 14 of the invention. CIA's 14 are also interchangeably termed below as line cards. A separate CIA 14 is coupled to each telephone line 12 corresponding to each one of the plurality of conventional coin telephone 10. Each CIA 14 in turn is coupled through a conventional telephone line 16 to a telephone central office 18. The switching network in central office 18 in turn is coupled in the conventional manner through a plurality of telephone lines 20 to a corresponding plurality of destination phones 22.

The plurality of CIA's 14 are coupled through bus 24 to a central processing unit (CPU) and bus interface circuit 26. CPU and bus interface 26 in turn is coupled through a personal computer bus 28 to RAM and disk memory 30. CPU and bus interface 26, bus 28 and memory 30 together comprise a voice message unit (VMU) for the plurality of (CIA's) 14. In the illustrated embodiment, the VMU 17 is a conventional PC-AT with the CIA's 14 inserted into the option slots.

An output channel 32 is coupled between central office 18 and CPU and bus interface 26. Output channel 32 is described below in greater detail in connection with FIG. 2 and provides telephonic communication between the VMU and central office 18, so that the voice message stored in the VMU 17 can be sent to destination phones 22.

An input-output buffer 34 is similarly coupled between CPU and bus interface 26 and an automatic message accounting teleprocessing circuit 36 (AMATPS-Bell Communication Research TR-TS7-000385, issue Jul. 1, 1986). AMATPS 36 in turn is coupled to a regional accounting office and automatic accounting teleprocessing computer for providing coin box accounting functions as described below. AMATPS 36 is a conventional data processing system utilized by conventional telephone switching systems wherein billing is computerized. Other than to the extent described here, the architecture and operation of AMATPS 36 is not further relevant to the invention.

Figure 2:
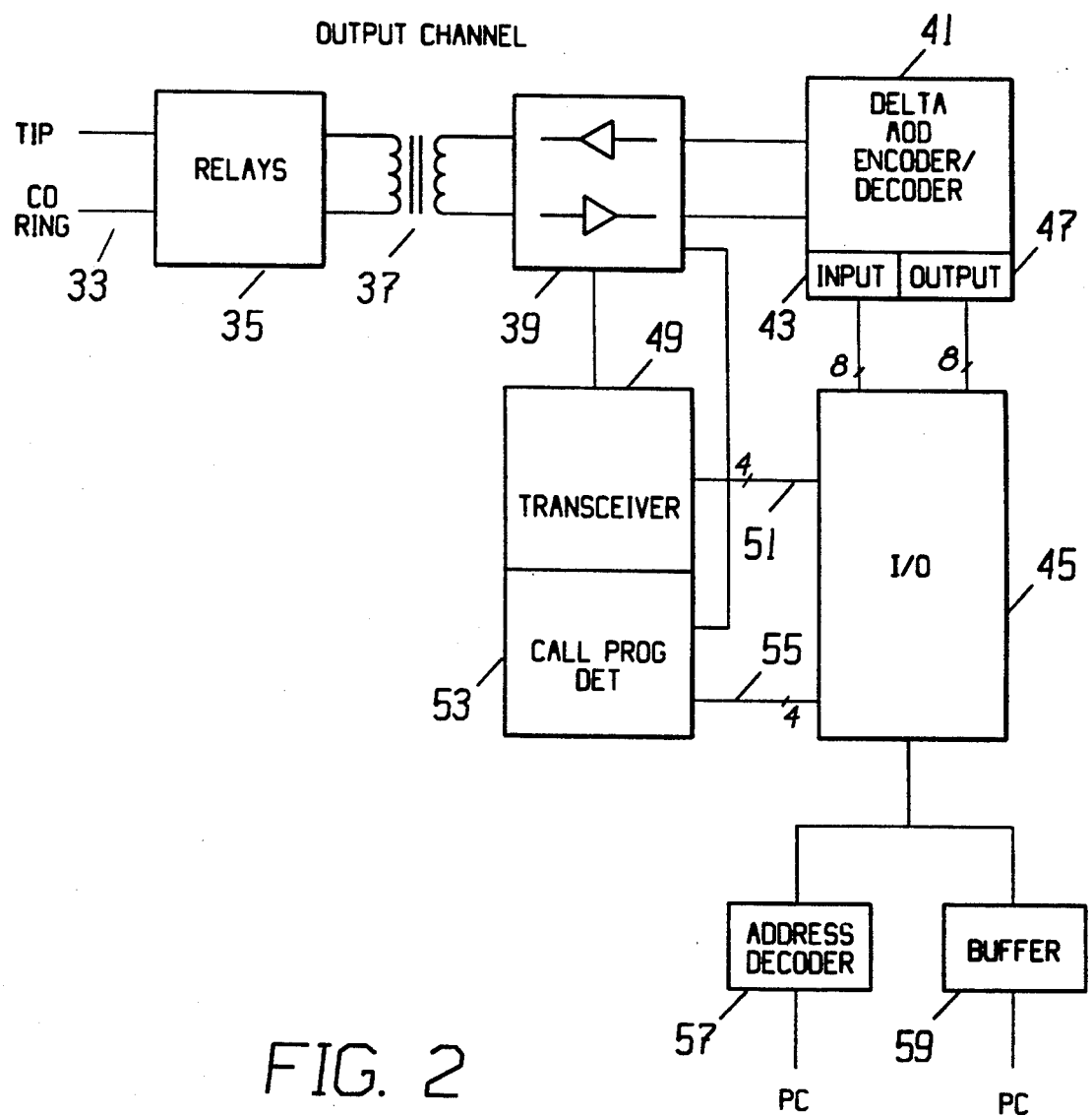
FIG. 2 is a diagrammatic block diagram of the output channel circuit illustrated in FIG. 1.

Turn now to FIG. 2 wherein output channel 32 is shown in greater detail. A conventional tip and ring telephone line 33 is coupled between output channel 32 and central office 18. Conventional telephone relays and current monitoring circuitry is included within relay/monitor circuit 35 with the voice signal being coupled across a transformer 37 to a bidirectional buffer amplifier of 39. The buffered and signal conditioned voice or analog signals are then coupled to a conventional delta modulator encoder/decoder which bidirectionally converts the analog signals to digital signals and vice versa. The digitized input signals are converted into parallel format by input circuit 43 and provided to an input-output buffer 45. Similarly, digital information placed with an input-output buffer 45 can be communicated in parallel format to an output buffer 47 for whence it is decoded into analog form and coupled through buffer amplifier 39, transformer 37, relay/monitor circuitry 35 to central office telephone lines 33.

DTMF tones received or transmitted through buffer amplifier 39 are coupled to a conventional incoming DTMF transceiver 49. The DTMF tones are coded and then communicated across a four bit bus 51 to input-output buffer 45. Similarly, the line tones are detected by call progress detector 53, decoded and transmitted across a four bit bus 55 to input-output buffer 45. The contents of input-output buffer 45 are addressably accessed from the VMU through an address decoder 57 and data buffer 59.

Therefore, voice information and other data stored within the VMU can be placed by the VMU into input-output buffer 45 and appropriate action taken according to the nature and status of the telephone communication with the central office 18 ultimately bidriectionally transmit voice or analog signals to destination phones 22.

As will be better described below, all message handling functions and record keeping are performed by the VMU while handling of the telephone status and communication is independently performed within CIA 14.

Figure 3:
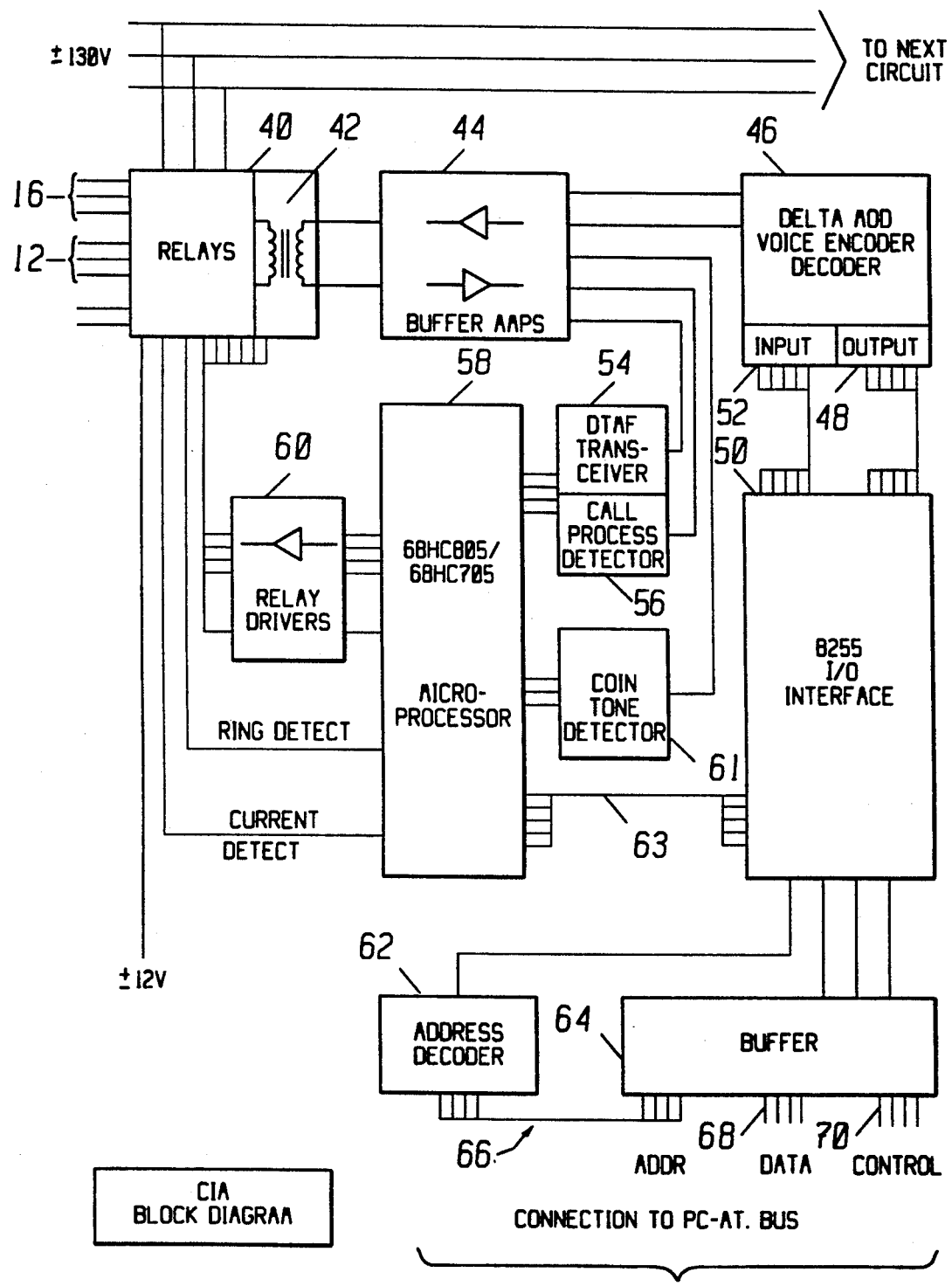
FIG. 3 is a diagrammatic block diagram of one of the call intercept apparatus shown in the embodiment of FIG. 1.

The overall system now having been generally described in connection with FIG. 1, turn now to the block diagram of a single CIA unit 14 as shown in FIG. 3. In the illustrated embodiment a tip, ring, and ground line, collectively denoted by reference numeral 12, are coupled to a relay/monitor circuit 40, which is similar in nature to relay/monitor circuit 35 of FIG. 2. Tip, ring, and ground lines, collectively denoted by reference numeral 16, are similarly coupled to corresponding relay/monitor circuit 40. The switched and conditioned analog or voice signals are coupled through the relay contacts to a transformer 42 and provided to a bidirectional buffer amplifier 44 which places the signals into a format appropriate for additional processing in a substantially similar manner to that performed by circuits 35, 37 and 39 of FIG. 2.

The voice signals are coupled to a bidirectional voice encoder/decoder 46. Incoming voice or analog signals are digitized and coupled through output 48 in parallel format into an input-output interface 50. Similarly, voice or analog signals coupled into CIA 14 from the VMU 17 are ultimately communicated through input-output interface 50 to input 52 and then in serial format to voice encoder/decoder 46 for coupling to selected ones of telephone lines 16 or 12.

The voice or analog signals are also directly coupled from buffer amplifier 44 to DTMF transceiver 54 and call progress detector 56. The DTMF tones are thus decoded and encoded by transceiver 54 and the line tones are decoded by call progress detector 56 with the results coupled to or from microprocessor 58 within CIA 14. In the illustrated embodiment an 68HC805 C4/68HC705 microprocessor manufactured by Motorola is used for CPU 58.

CPU 58 is coupled to and selectively controls relay driver circuit 60 which in turn selectively drives one or more of the relays within relay/monitor circuit 40. Ring detection and off-hook detection is sensed by conventional circuitry in relay/monitor circuit 40 and coupled as data inputs to CPU 58.

A conventional coin tone detector 61 is also coupled to buffer amplifier 44 for receiving coin box tones indicative of coin insertions. The tones are detected and decoded into digital format for coupling to CPU 58 so that the denomination and number of coins inserted into pay phone 10 can be determined by CPU 58.

Input-output interface 50 is bidirectional and conveys digital information between microprocessor 58 and the VMU via decoder 62 and buffer 64 and buses 24 and 63. Therefore, microprocessor 58 bidirectionally communicates information through interface 50 to an address decoder 62 which, together with data buffer 69, is communicated to a conventional PC-AT address bus 66, data bus 68 and control bus 70, collectively denoted in FIG. 1 as bus 24.

The general circuit architecture now having been described in connection with FIGS. 1–3, consider the methodology of operation as described below in connection with FIGS. 4 and 5. Communications within the system of FIGS. 1–3 includes the function of call intercept and voice messaging, spot message advertising, coin free speed dialing, coin box totalizing, and call record accounting. The system (VMU) retains the dialed information of each call and the CIA monitors telephone line 16 to central office 18 for a busy or ring no answer.

If the called number is busy, the line connection to central office 16 is released and the caller receives voice prompts from the VMU about the voice message services. If the caller elects to use the voice message services, he is prompted on how to leave the message to be stored for future delivery. The system stores the message within memory 30 and attempts to deliver it at selected later times.

If a calling party receives a ring but no answer, after a predetermined number of rings, a voice prompt is imposed over an attenuated ring signal. If the caller elects to use the voice message services, then the call is processed as described above in connection with a busy condition.

If the caller remains off hook and does not elect to use the voice message service, continued ringing will be heard until a predetermined number of additional rings. If the call is answered during the voice prompt, a talk path is reinstated. The system will disconnect the call after a predetermined number of rings thereby releasing unprofitable network usage.

Since the system is a call intercept line port and a voice message service, no dialing to a centralized voice message service occurs. Dial-out lines for each pay station line are not required. Interaction between the pay station and the voice message service in virtually instantaneous.

In addition to the foregoing functions, the system is used in combination with phone booth or other advertising to inform the customer of coin free speed dialing to services such as a voice prompt, "For yellow cab coin free dial #22". The system will then translate the key strokes #22 and speed dial the cab company. Records are maintained in the VMU for appropriate billing of the service.

Further when a pay station line is accessed, a brief announcement can be delivered to the calling party. In the illustrated embodiment up to 20 different announcements are available and a different one out of the 20 available is delivered each time the line is accessed. Spot advertising can be delivered before the dial tone, between the dial tone and dialing, or after dialing. Records again are maintained for appropriate advertising and billing.

The system accumulates total dollar amount and number of specific coins that are inserted into each pay station. The records are maintained and transmitted to a centralized accounting computer as desired.

The result of performing these functions provides the coin telephone system operator an opportunity to collect revenue on a transaction which would otherwise produce none, allows him to create advertising revenues, and provides automated data collection statistics on the coin operation both for billing and coin box status.

In the illustrated embodiment six CIA cards are mounted in a PC-AT compatible computer. Each card can handle four lines for a total of 24 coin phone line circuits. The system is capable of being connected to a three wire tip ring and ground line, a measured business line (MB) or any two wire tip and ring line.

Figure 4:
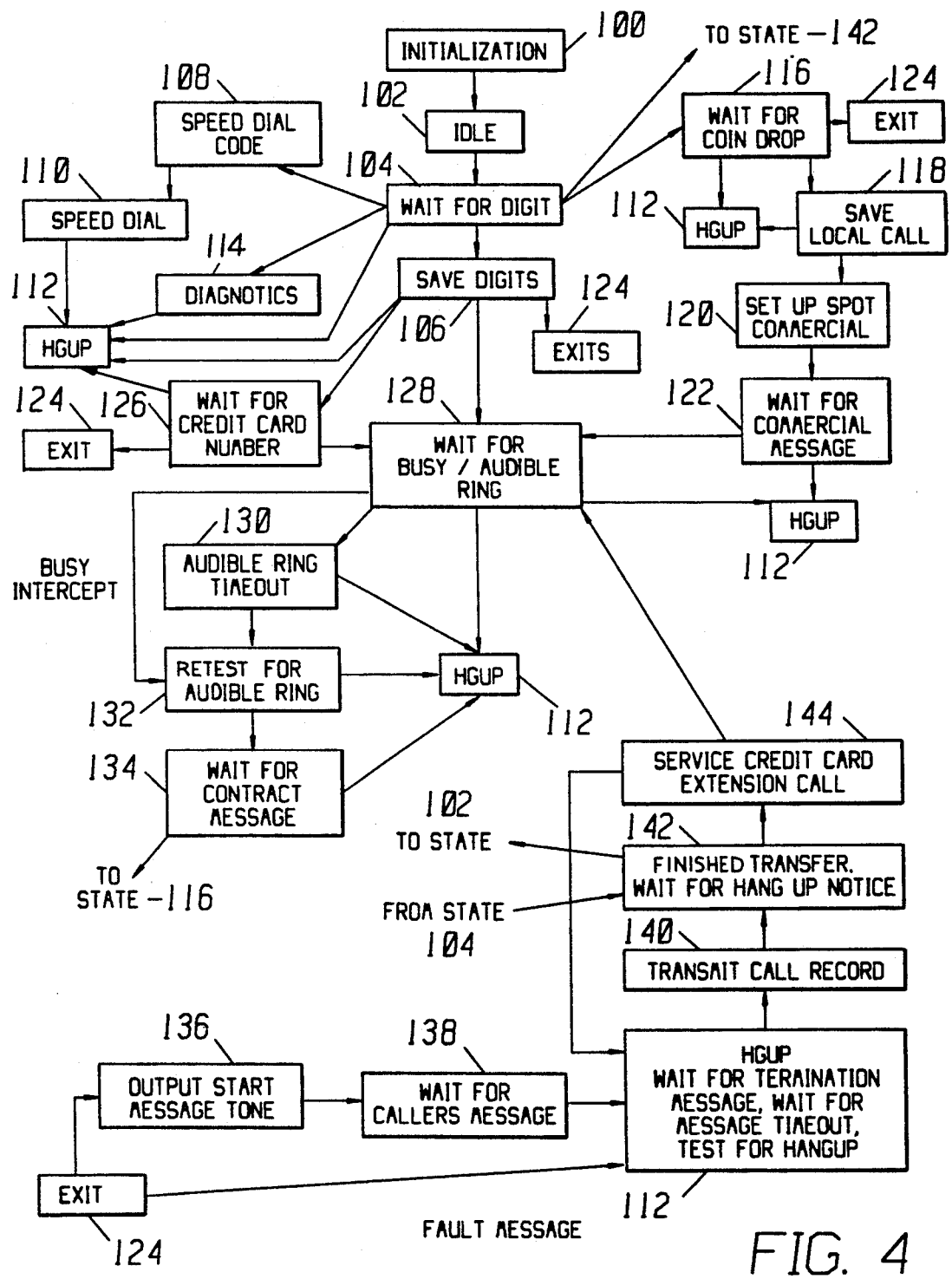
FIG. 4 is the state diagram for the operation of the call intercept apparatus of FIG. 3.
Figure 5:
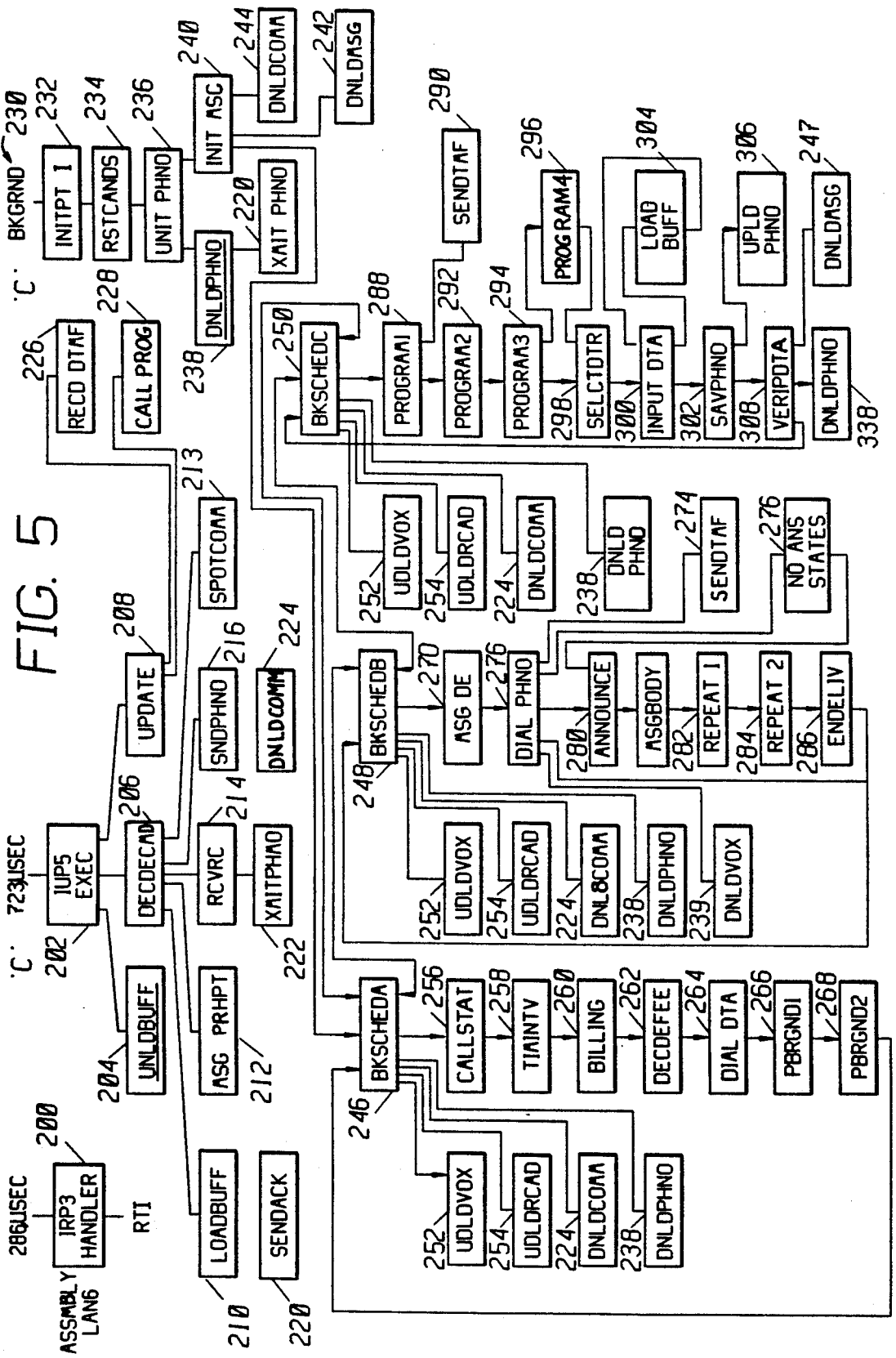
FIG. 5 is the state diagram for the operation of the voice message unit shown in FIG. 1.

Separate software states as described in connection with FIGS. 4 and 5 are provided for a CIA line card 14 and VMU computer 28. Line card software is provided for call intercept functions, while VMU software provides parameter programming, call record processing and message delivery functions. All voice messages, including message prompts, spot commercials as well as the caller's messages are stored in VMU memory 30. The voice message unit, comprising CPU circuit 26 and memory 30, responds to command words from CIA line cards 14 to input or output the data.

For the purposes of illustration, consider the operation of the system for a 2 or 3 wire coin phone line. The CIA 14 monitors the off hook condition in an idle state. Each time an off-hook condition is detected, the call is split from the central office and a 4 second spot advertisement message is output from the VMU on a rotating basis. In the illustrated embodiment there are a total of 20 messages available. When the spot message time interval is over, typically 4 seconds, the system reconnects the caller to the central office.

If the caller deposits a quarter and the first digit dialed is 1–9, the system saves the digit string dialed by the caller. If the first digit dialed by the caller is 0, the system saves both the telephone number and the credit card number.

Next the call is monitored for a busy or a ring-no-answer condition, but only if the digit string is greater that 3 numbers. Both cadence and dual tone detection are available to detect busy or ring back tones. If a busy or ring-no-answer condition is detected, the system offers a voice messaging service to the caller by outputting a contract message prompt. For example, "Your line is busy or does not answer. For an additional 25 cents, we will try to deliver your 30 second message every 15 minutes for the next two hours. If you wish to use this service, please deposit now."

The system then listens for coin drop tones by means of circuit 61 and the amount of coinage received is totaled. If the correct total is not received within a predetermined time, the coins deposited by the caller are returned and the system will output a fault message such as:

"There is a problem in completing your call as dialed. Please hang up and dial again."

The caller then repeats the process. If the correct amount is still not detected, the deposited coins are returned and the system returns to a standby state to wait for the caller to hang up.

When the amount of coins deposited by the caller is correct, the system outputs a standby message such as:

"Please standby to enter your message in the voice message computer."

When the handshake signal comprising a # tone is received from the VMU, CIA 14 will transmit to the VMU the code representing the originating coin phone number, a busy or audible ring intercept status code, a phone number dialed by the caller, the credit card if the first digit dialed by the caller was zero, and the coinage received. The system then goes to a standby state to wait for the caller to hang up. When the caller hangs up after entering his message as prompted by the VMU, the deposited coins are collected through the transmission of a 130 volt pulse from CIA 14 through circuit 40 to the coin phone relay.

If after the spot message has been delivered, the caller dials three predetermined keys in sequence, such as *#0, all voice message announcements made thereafter will be made in a second language, typically specified by the telephone service provider, such as Spanish. The voice announcements will return to the English language prompts each time the caller hangs up.

Further, if another predetermined code is dialed, such as one of the series *00-*19 after the spot message, the system will speed dial a prespecified phone number among a list of 20 prestored numbers. These numbers are dialed using the measured business (1MB) port on the system. If a coin phone line is used instead, the speed-dialed numbers will be dialed through an 800 prefix.

If the caller hangs up at any time during the dialing sequence before access to the VMU is made, the coins deposited by the caller are returned. If the caller hangs up at any time after access to the VMU is made, the coins are not returned. Speed dialing is performed without the use of coins.

If after the call is made, a busy or no answer condition is not detected, the system or CIA 14 will wait in a standby state for the caller to hang up. When a hang up is detected, a call record is transmitted to the voice message unit for recording.

The method of operation of the invention is controlled by software which runs in CPU and bus interface 26 and in each CIA 14. CPU and bus interface 26 provides certain interrupt handlers to service the voice input-output data and to respond to command requests from the plurality of CIA's 14. A background program in CPU and bus interface 26 also enables the message prompts, provides the spot commerical messages to be entered into the computer memory, performs the message delivery routines to central office 18, and formats the call record data and output to IO buffer 34. When the system is first powered up, the background program stored within the CPU and bus interface 26 outputs reset signals to all channels and the plurality of CIA's 14. Message prompts and spot commericals are down loaded to RAM from disk memory. The coin telephone numbers are downloaded from the disks to a RAM buffer, one channel at a time and then transmitted to CIA's 14.

The background program performs message delivery functions which occur at 15 minute intervals, programming tasks which occur on a demand basis, and a call record analysis which occurs each time a call is made. The call record is formatted to be outputted either to a printer or to a remotely located computer. In the illustrated embodiment the messages left by the callers are of 30 seconds maximum duration. Attempts will be made to deliver the message up to eight times or until actually delivered. An attempt to make delivery is made every 15 minutes. If there is a busy intercept, the first delivery reattempt will be immediate. If there is no answer, delivery will then be made after 15 minutes. The caller's message is deleted from memory after delivery or a time out.

In the illustrated embodiment 24 messages comprise the call record. Each record includes the called telephone number, the credit card number, the coin phone station number, the number of nickels, dimes and quarters inserted into the coin phone, the number of nickels, dimes and quarters charged as an intercept fee, and the call status. Call status of a call record is set to indicate whether it is ringing i.e. inbound, being rung i.e. outbound, intercepted or not intercepted, correctly or incorrectly dialing, speed dialed or not, whether in English or not, busy or not, receiving an audible ring or not, accepting or returning coins, whether the caller has hung up or not. Additional words in the call record for diagnostic faults are also provided.

The background program can also then accumulate statistics from the call record and form summaries relating to traffic and usage, billing, coin box accounting, along with maintenance and diagnostics according to the user's preferences. For example, the total number of calls and the average time interval in which there is a busy/no intercept, busy/intercept, no answer/no intercept, or no answer/intercept can be provided. Never completed calls, 800 calls, emergency calls, repair service calls, operator assisted calls, intra- and interstate calls and international calls can also be summarized. The total number of outbound calls, incoming calls, caller hang ups or number of coin returns is summarized. For purposes of billing all the information necessary for operator assisted calls such as called number, calling station, time of usage, date and time called made, carrier and credit card number are stored and summarized together with the speed dialing numbers and associated billing data.

In terms of coin box accounting cumulative nickel, dime, and quarter counts for the coin phone usage together with intercept fees accounted by coin denomination is also provided. Maintenance and diagnostics on the phone calls can be maintained such as detection of a stuck coin, shorted phone, open phone, lack of dialing tone, or voice messaging problems indicated by failure of intercept handshake receipt.

FIG. 4 is a state diagram of the software stored and implemented within each line card or CIA 14. Operation of the software for each CIA 14 is based upon a real-time multitasking scheduler which keeps track of system operation. For example, if a task is being implemented within CIA 14 and has progressed to the point where it is waiting for a response from another part of the system, such as the caller, return signals through central office 18 or the like, the scheduler will move to the next task needed to be performed while remembering that the last task is waiting for an input. After the next task is completed or at another appropriate point, the scheduler will then return to the prior task if the input has been provided and then complete the prior task before moving on to the next task to be performed.

In this light, microprocessor 58 within CIA 14 is always profitably utilized as long as there is a task to be performed, and an operation will not be delayed longer than necessary for completion of input and output routines. Therefore, the scheduler will efficiently operate among a plurality of subroutines or program states as illustrated in FIG. 4 according to demand and ability of the system to perform the demands. It should thus be understood that the diagrammatic depiction of FIG. 4 is a state diagram and is not a flow diagram of the methodology of the invention. The actual operation of CIA 14 will vary from moment to moment depending upon the demands which are being made upon it.

On power up CIA 14 begins with initialization state 100 during which registers are cleared and flags reset. After initialization CIA 14 enters an idle state 102 wherein it waits for an off hook or input ring condition. If the corresponding phone line 12 goes off the hook, CIA 14 then enters a state 104 wherein it waits for digital inputs from the caller. If the digits are entered by the caller they are then saved in state 106.

However, if #N1 N2 are dialed the caller is speed dialing and state 108 is entered with suppression of the dial tone and make the connection through the measured business lines. Depending on the speed code selected the corresponding telephone number will then be speed dialed by state 110. When the message is completed, a hang up state 112 entered.

However, if the caller dials * #0 selected diagnostics can then be entered through a diagnostic routine in state 114. Diagnostic conditions within CIA line card 14, or another portion of the system, can then be interrogated according to the service personnel's discretion. The call can then terminate by hang up or the call may be hung up directly from state 104.

Upon generation of a signal which saves the digits, a state 116 is implemented which waits for the coin drop. If it is a local phone call the local phone numbers are saved in state 118. State 120 sets up CIA 14 for a spot commercial message. While the caller is waiting for the connection to be made through central office 18, the commercial message or advertisement is sent. The caller may go back on hook at this time.

Returning to the state 116 wherein CIA 14 is waiting for the coin drop, the caller may choose not to allow an intercept of this call thereby prompting a coin return and hang up. Ultimately the call will terminate and the coins will be accepted with entry into the exit state 124.

If in state 118 where the telephone number for the local call is being saved, the caller may hang up at this time.

Returning now to state 106 should the caller have dialed a sequence indicating that he is entering a credit card number, state 126 is entered and the credit card number is received. Thereafter the caller may hang up, complete the call and advance to the exit state 124, or if the numbers are appropriately entered, enter state 128 wherein a busy or audible ring tone is sought. State 128 may also be directly entered from state 106 for a conventional coin paid call.

Alternatively, if there is incoming dialing or a three digit number is dialed, exit state 124 described below may entered from state 106.

Similarly, on a coin paid call after the commercial message is received from state 122, state 128 is entered and the busy/audible ring sought. The caller may hang up from state 128 or if an audible ring is received, state 130 is entered which will generate a timeout if the phone is not answered after a predetermined number of rings. If the timeout has occurred, it may be possible that no rings were received. State 132 is then entered and CIA 14 retests for an audible ring. If a busy intercept is detected, state 132 is entered directly from state 128.

If it is finally determined that the phone is not picked up after a predetermined number of rings, the contract message is provided to the caller at state 134. Once the contract message is played, state 116 can be entered and coin drops detected as described above.

The exit state 124 entered at various points within the methodology as described above sets up predetermined exit messages. The start-message tone is generated at state 136 from state 124 indicating that the caller may now input his message. The caller's message is obtained in state 138 and after completely received, a termination message is generated at state 140. State 138 outputs the end of message prompt. State 140 also waits to detect a caller hang up or a message timeout if the caller fails to deliver his message within a predetermined time. A 130 volt high voltage signal is sent to the pay phone dropping the coins into the coin vault. In addition, if a fault message is received on the condition of no dial tone, no handshake from the VMU, or error in dialing, hang up state 112 may be directly entered from exit state 124. Once the call is completed the call record is transmitted in state 140, the transfer finished, and CIA 14 waits for the hang up notice in state 142.

If the call was a credit card extension call, it is then serviced in state 144.

If the caller has then not yet hung up, state 128 is reentered wherein the busy/audible ring is awaited. Otherwise if the call is completed and the caller hung up, hang up state 112 is reentered.

Alternatively after the completion of the transfer of the call record in the state 142, processing may return to the idle state 102 from state 142.

If the caller enters * #1 in the wait state 104, processing enters state 142 where the language set up is reset, for example, to provide Spanish language message opposed to English language messages.

The state diagram for CIA 14 now having described, turn now to FIG. 5 wherein a state diagram from CPU and bus interface 26 is shown. The methodology is implemented within interface 26 is divided into three parts. First there is an interrupt handler 200 which responds to the voice requirements by inputting the caller's message and outputting the message prompts, spot commercials and message delivery when requested.

A second interrupt handler 202 accesses foreground states 204-208. State 204 serves to unload RAM input buffers and transfer them to disk when full. State 206 decodes the command word received from CIA 14 to determine which functions to call to service the line card request. State 208 updates real time parameters. State 208 advances the free timers used by the system, detects current on the line and determines if a DTMF tone exists on the output channel.

State 206 in turn calls five additional states 210–218. State 210 inputs the caller's message. When the command to input the caller's message is received, the message is stored in an empty input buffer.

State 212 provides a message prompt output. The call intercept message prompts the caller about the voice messaging service set up by the program.

State 214 receives the call record. The call records are transmitted by CIA 14's and stored in a RAM buffer array. The called telephone numbers are loaded in the phone array buffer. The upload routine is called to save the call record into disk memory.

State 216 sends the phone number of the coin phone to the requesting channel or CIA 14. State 218 downloads the spot commercial from the disk after each call and outputs it on the next call.

States 210 and 214, in turn, access state 220 which sends an acknowledgement signal back to the requesting CIA 14.

State 216 in turn calls state 222 which transmits the phone number stored in the VMU memory to the requesting CIA 14.

State 218 in turn calls state 224 which downloads the spot commercials from disk into a RAM buffer for use. Update state 208, in turn, calls upon state 226 which reads the output port and returns the DTMF digit received from the currently accessed CIA 14.

State 228 is also called by update state 208. State 228 receives the call progress signal on the output channel 32 and decodes it for a busy, ring back or dial tone indication.

As illustrated in FIG. 5 the larger portion of the program executed within CPU and bus interface 26 is the background program 230. Conventional initialization functions are performed by state 232, and each microprocessor 58 in each CIA line card is reset by power up by state 234. Each of the 24 lines 12 are initialized with their respective calling phone numbers by state 236. The 24 telephone numbers serviced by the illustrated embodiment are downloaded from disk memory to a RAM buffer by state 238. The 10 phone digits of each pay station are transmitted from the coin phone RAM buffer to microprocessors 58 in each of the CIA line cards 14 by state 222.

Phone initialization state 236 also accesses state 240 which calls a download routine to preload the RAM message memory with voice data. State 242 from state 240 downloads the message prompts from disk memory to RAM memory. In the illustrated embodiment the 20 spot commercial messages are also downloaded from disk memory to RAM memory by state 244.

Three background schedulers are provided within the background program. The task A background scheduler of state 246 is accessed from initialization state 240. State 246 calls the task A states which are defined as those which are serviced after each call function. The task B background scheduler 248 calls the task B states which are defined as those which service the message delivery functions, typically serviced every 15 minutes. The task C background scheduler 250 calls the task C states which are defined as those which service on-demand functions.

Consider now the task A functions serviced by background scheduler 246. State 252 loads the caller's message in RAM input buffers to disk memory. State 254 sends the present call record in RAM to a predetermined file in disk memory. States 224 and 238 described above are also accessible by the task A background scheduler 246.

Background scheduler 246 also calls state 246 which decodes the traffic and usage data in the call status buffers for printout. State 256 calls state 258 which decodes the average time of the call computed in seconds. State 246 in turn calls state 260 which computes the billing data for credit cards and speed dialing calls and stores them in a billing data array. State 262 called by state 246 calculates the telephone use fee and intercept fee. State 264 called by state 246 examines the diagnostic data and saves the cumulative sum of the number of errors in a diagnostic RAM array for use by the print data state. State 266 creates background graphics and text for usage traffic and coin box accounting data. State 268 creates background graphics and texts for billing and diagnostic data.

Once the sequential call of states 256 through 268 along with states 252, 254, 224, and 238, have been performed, the processing is returned to task A scheduler 246.

The task B background scheduler 248 can also separately access states 252, 254, 224, 238 in the same manner described above in connection with task A background scheduler 246. In addition background scheduler 248 sequentially accesses the download voice states beginning with state 270 which accesses the current active caller's message file. State 272 dials the phone number of the current message to be delivered if a busy or no answer condition is not encountered. When the busy condition is encountered, the remaining task B states are bypassed and the task B background scheduler turns to state 248. When a no answer condition is encountered, the no answer condition is tested again after six ring backs. Dialing is performed by state 274 and the no answer test is performed by state 276.

State 278 outputs an announcement message to the called party when the ringing stops (no ring back) and a busy/no answer signal is not encountered. State 228 sends the caller's message over the selected output line after the announcement message is over. State 282 asks the called party if the message should be repeated. If the called party responds with a yes by an appropriate DTMF or pulse return, the message is repeated by state 284. If the response is no, a thank you message is given. State 286 terminates the message delivery task.

The task A and task B function now having been described turn finally to the on-demand task C functions handled by background scheduler 250. Again states 252, 254, 224, and 238 can be directly and independently accessed by background scheduler 250 in the same manner as described in connection with the task A background scheduler 246.

State 288 provides for caller program input. First an asterisk is entered and a beep tone produced. After the beep is heard, the user enters two digits to input data and enters #* to verify data. State 288 sends out a beep tone if the star key is received. State 290 producs corresponding DTMF tones to the digits which are input. State 292 detects and saves the second digit in the program string which is prefaced with an asterisk or asterisk and pound sign. State 294 detects and saves the third digit in the program string again if prefaced by and asterisk or an asterisk pound. State 246 detects and saves the fourth digit in the program string, #* N1 N2. State 298 decodes the digits entered by the caller to determine the pointers to the message prompts, spot commercials, or telephone number RAM memory array. In the illustrated embodiment the numbers 0–9 point to message prompts, 10–29 point to spot commercials, 30–53 point to channels or telephone numbers.

State 300 waits for a timeout if voice is the input data and call routines to upload voice from RAM to disk. If the input data is the coin telephone number, the task C scheduler proceeds to save the phone number state. State 302 saves the coin phone number entered from the monitor phone in a coin buffer in the coin phone RAM memory array. When the array is filled, data is uploaded by calling the state that transfers data to the disk. State 304 is the routine which actually uploads voice from RAM to disk. State 306 can be called by state 302 and actually transfers the coin phone number in the coin buffer RAM memory to the disk memory. State 308 downloads the data from disk memory to RAM and transfers it to the output channel to the monitor phone or digigrabber to verify the input data. Downloading the phone numbers and messages is also performed through accessing states 238 and 242 from verifying state 308. Otherwise processing returns to background scheduler state 250 and continues to background scheduler state 246 to repeat the execution of the task A states.

The integration of the call intercept unit and a voice message delivery unit through an internal digital link results in a number of significant advantages. Communication between the call intercept unit and the voice message delivery unit is performed over the digital link or bus in a digital format, for example at 3500 words per second, as compared to the more limited telephone transmission link rate of 20 words per second.

Since the central office computer system is not utilized to connect the call intercept unit with the voice message delivery unit, communication between the two units proceeds totally independently of and unaffected by the condition or work load on the telephone company equipment. This has the additional benefit of removing communication traffic from the telephone company equipment.

The use of a private digital data link between the call intercept unit and the voice message unit also results in a significant improvement in the signal-to-noise ratio of the communication. Therefore, the sound quality of the voice messages, which are stored in the unit, are dramatically improved and the system data error rate is substantially reduced over voice messaging units that are communicated over telephone lines.

Since the system uses a multiprocessor configuration, each line contains its own computer, analog-to-digital and digital-to-analog convertors, DTMF transceiver, call progress and coin detectors, together with phone line control relays. This configuration results in a simplified and reliable product because only the voice data and memory functions are time shared. The functional requirements of each phone line are independently controlled for each line and independently controlled from the common voice message tasks. Software control of the phone line is thereby dramatically simplified over a system which attempts to simultaneously control both the call intercept and voice message functions from a single central computer.

Hardware reliabilities improve since the call intercept microprocessor operates only on a single telephone line. Should the voice messaging computer fail, only the voice messaging function is lost, since all other functions handled in the telephone communication are independently serviced by the processors within each call intercept unit.

The system includes intercept relay networks that contain current monitors for both the coin telephone lines and the central office side of the line. Therefore, different line requirements can be satisfied for each side of the line only by changing the call intercept software. Such differences in line configurations do not require any changes in the software driving and voice messaging unit. The system can be connected to a coin telephone line, a business line, a central office, private branch exchange (PBX), or a two or three wire plus or minus 130 volt line. Microprocessor control these lines allow different system requirements to be met with only software changes.

In addition to serving the primary function of providing message service for outbound calls from the coin operated telephones, inbound calls originating from telephones directly connected to the central office system are also served by the system without alteration. The inbound call is monitored using the line current from the central office while the outbound call is monitored using the line current connected to the coin telephone. The inbound call monitor provides services similar to the functions performed by an answering machine or electronic voice mail system, while the outbound call monitor will provide voice messaging to called parties who may or may not have automated answering machines.

The system also provides opportunities for communication and revenue generation based for such communication. On the occurrence of the busy or no-answer condition, the system will provide an opportunity to collect revenue on a transaction which otherwise would produced none, namely by leaving a voice message for additional charge.

Short spot commercials with a nominal length of four seconds can be inserted at off hook conditions where appropriate. The spot commercials are played on a rotating sequence thereby providing an additional opportunity for communication and revenue generation not otherwise possible.

The coin box status is remotely and automatically monitored by the system. This results in reduced upkeep and maintenance cost to the telephone company.

The speed dialing capability built into the system also provides a revenue source from speed dialing subscribers who would be charged on the fixed or variable fee rate depending upon the number of calls made to them.

The system can be used in non-coin telephone applications. For example, the system can be installed in series between the central office and a PBX. In such an installation, such as monitoring a motel or hotel room telephone, voice messaging services can be readily provided for both inbound and outbound calls.

The completely digital nature of the system for both the call record and voice messages allows for full compatibility with the central office data format.

Finally, the system can be installed between the telephone company switching computer system and an automatic message counting teleprocessing system such as a Belcor AMATPS transmitter (technical reference TR TSY 000385). The digital data is configured through program control to meet the billing and accounting requirements of the Belcor AMATPS transmitter.

Many alterations and modifications may be made by those having ordinary skill in the art without departing from the spirit and the scope of the invention. Therefore, it must be understood that the illustrated embodiment has been set forth only for the purposes of the example and should not be taken as limiting the invention which is defined by the following claims. The following claims thus must be read to include not only what has been expressly shown and described in the illustrated embodiment, but also to include all equivalent or like elements which achieve the same result even though performed through a substantially different function in a substantially different way.

I claim:

1. An apparatus for use in combination with a plurality of coin operated pay phones, a telephone central office switch system and with a plurality of destination telephones coupled to said central office switch system, said pay phones, destination telephones and central office switch system coupled together through telephone lines, said apparatus comprising:

a plurality of call intercept means, each one of said plurality of call intercept means for handling voice communication on corresponding ones of said telephone lines coupled to one of said plurality of coin operated pay phones and to said central office switch system;

computer means for storing and processing digital information outside said central office switch system; and a digital bus coupling said computer means with each of said plurality of call intercept means, said computer means being coupled to said central office switch system and operative to voice interactively communicate through said plurality of call intercept means with each one of said plurality of coin operated pay phones to selectively store a voice message originating with at least one of said plurality of coin operated pay phones through said corresponding one of said plurality of call intercept means, voice communication between said call intercept means and said plurality of coin operated pay phones being performed without accessing said central office switch system, said voice message for later selective transmission by said computer means through said central office switch system to a user selected one of said plurality of destination telephones, whereby voice messages are received from a said plurality of coin operated pay phones and stored without dependence upon communication through said central office switch system.

2. The apparatus of claim 1 wherein said computer means comprises:

a central processing means coupled to said digital bus;

a memory means for storing digital information, said memory means being coupled to said digital bus; and output channel means coupled to said digital bus for communicating decoded analog information from said computer means to said central office switch system.

3. The apparatus of claim 1 wherein said computer means transmits a selected one of a plurality of advertising messages through selected ones of said call intercept means to corresponding selected one of said plurality of coin operated pay phones prior to completion of connection of said selected one of said plurality of coin operated pay phones with said central office switch system and without coaction with said central office switch system.

4. The apparatus of claim 1 wherein each of said plurality of call intercept means comprises means for performing abbreviated dialing with an abbreviated number from said corresponding one of said coin operated pay phones, a complete telephone number corresponding to said abbreviated number sent from said corresponding coin operated pay phone being transmitted to said central office switch system by said apparatus wherein said complete telephone number transmitted to said central office switch system is provided to a selected one of said call intercept means from said computer means.

5. The apparatus of claim 1 wherein each of said call intercept means comprises:

a microprocessor, said microprocessor for handling bidirectional voice communication between said plurality of coin operated pay phones and said computer means;

a plurality of relays selectively driven by said microprocessor;

a bidirectional voice encoder/decoder for analog-to-digital and digital-to-analog conversion, said plurality of relays being selectively coupled to said plurality of coin operated pay phones and central office switch system on one hand and to said voice encoder/decoder on the other;

an input/output interface means for addressably receiving and transmitting digital information, said input/output interface means being coupled to said voice encoder/decoder and to said microprocessor;

bus interface means coupled to said input/output interface means, said bus interface means being coupled to said digital bus.

6. The apparatus of claim 1 wherein each of said call intercept means further comprises current monitoring means for monitoring signal conditions in arbitrary signal formats on said telephone lines coupled to said plurality of coin operated telephones to said call intercept means and on said telephone lines coupled to said central office switching system, and wherein said computer means is the sole situs of storage of said voice messages selectively received from said plurality of coin operated telephones so that said apparatus is adaptable to being coupled to telephone lines of different signal format without alteration of the storing of voice messages within said computer means.

7. The apparatus of claim 1 wherein said computer means comprises means for monitoring inbound calls from one of said plurality of destination telephones through said central office switch system to a selected one of said plurality of pay phones, said inbound monitoring means for providing message storage of said inbound call and delayed delivery of said stored message to said selected one of said plurality of coin operated pay phones.

8. A method of providing simultaneous voice messaging between multiple ones of a first plurality of telephones through a central office switch system and a second plurality of telephones without accessing said central office switch system to leave a voice message comprising the steps of:

originating calls in said first plurality of telephones;

detecting busy/no answer responses from called ones call to said second plurality of telephones through said central office switch system, said step of detecting being performed in a call intercept means coupled between said first plurality of telephones and said central office switch system, said second plurality of telephones being coupled to said central office switch system;

providing prestored voice prompts outside of said central office switch system, stored in a voice message means coupled to said call intercept means to offer voice message storage within said voice message means for each of said called second plurality of telephones returning a busy/no answer response;

detecting acceptance of a message intercept without use of said central office switch system for each of said called second plurality of telephones returning a busy/no answer response;

storing a message from a caller at one of said first plurality of telephones within said voice message means without use of said central office switch system for each of said called second plurality of telephones accepting a voice message offer;

selectively later delivering said stored messages from said voice message means outside of said central office switch system to selected ones of said second plurality of telephones by communication through said central office switch system, whereby voice message recording and storage are performed independently of said central office switch system.

9. The method of claim 8 further comprising the step of delivering to said caller at said one of said first plurality of telephones an advertising message prior to completion of connection with said central office switch system.

10. The method of claim 8 further comprising the steps of:

originating a call from said second plurality of telephones to one of said first plurality of telephones through said central office switch system;

providing voice prompts to a calling telephone of said second plurality of telephones offering to store a voice message within said voice message means;

detecting acceptance of a offer from said caller at said calling telephone of said second plurality of telephones;

storing said voice message provided by said caller in said voice message means; and selectively later delivering said stored voice message to said selected one of said first plurality of telephones without use of said central office switch system, whereby both incoming and outgoing telephone calls are provided with voice message capability.

11. An apparatus for providing voice message storage between a first plurality telephones and a second plurality of telephones connected through a central office switch system comprising:

a plurality of first programmable means for selectively processing telephonic communication between said first and second plurality of telephones through said central office switch system;

a digital bus coupled to said plurality of first programmable means; and a single second programmable means coupled to said digital bus, said second programmable means for providing stored voice prompts to said first and second plurality of telephones, said second programmable means for providing selective storage of voice messages from any one of said first and second plurality of telephones to be subsequently delivered to a selected other one of said first and second plurality telephones, said voice message from a caller using one of said first plurality of telephones being selectively stored within said second programmable means outside of said central office switch system and without communication through said central office switch system, whereby voice messaging with at least said first plurality of telephones is performed independently of said central office switch system.

* * * * *